April 14, 1953 — J. W. MERZ — 2,634,518
BULLDOZER
Filed Nov. 1, 1948 — 2 SHEETS—SHEET 1

Inventor
John W. Merz
By Glenn L. Fish
Attorney

April 14, 1953  J. W. MERZ  2,634,518
BULLDOZER

Filed Nov. 1, 1948  2 SHEETS—SHEET 2

Inventor
John W. Merz
By
Glenn L. Fish
Attorney

Patented Apr. 14, 1953

2,634,518

UNITED STATES PATENT OFFICE 2,634,518

BULLDOZER

John W. Merz, Spokane, Wash.

Application November 1, 1948, Serial No. 57,743

3 Claims. (Cl. 37—144)

The present invention relates to the general class of excavating scrapers and ditch fillers, and more specifically to an improved bulldozer or motor-operated tractor of the endless track type, which while well adapted for various purposes and uses is especially designed for use when working over irregular banks, sloping surfaces, and rocky ground where the tractor is caused to be tilted laterally. To compensate for the irregular position of the tractor under such conditions, the scraper blade and its frame are provided with means whereby the blade may selectively be tilted laterally in a vertical plane for efficiency in its scraping operations. For this purpose the longitudinally extending scraper frame, which is swiveled at its rear ends upon spaced horizontal and alined axes, is also capable of selective and independent vertical adjustments at either side of the tractor.

The excavating implement as a unitary attachment for a tractor includes a minimum number of parts that may be manufactured with facility at low cost of production, and the parts may be assembled with convenience for facile installation on the tractor to insure a strong and rugged implement that may readily be controlled by the driver of the tractor, for efficient performance of its functions.

The invention consists in certain novel features of construction and combinations and arrangements of parts as will hereinafter be set forth and more particularly pointed out in the appended claims.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 1:
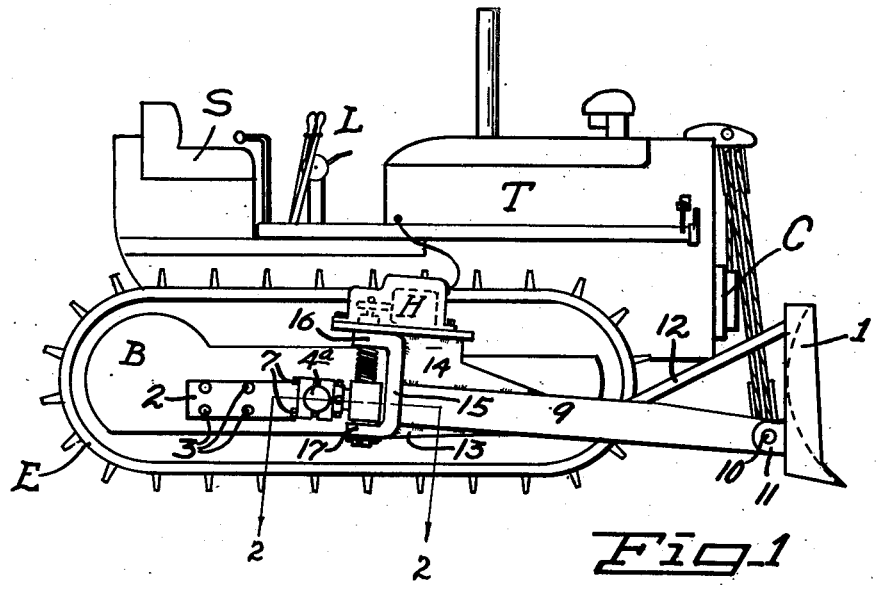
Figure 1 is a side view of a tractor that is equipped with the implement in which my invention is embodied.
Figure 2:
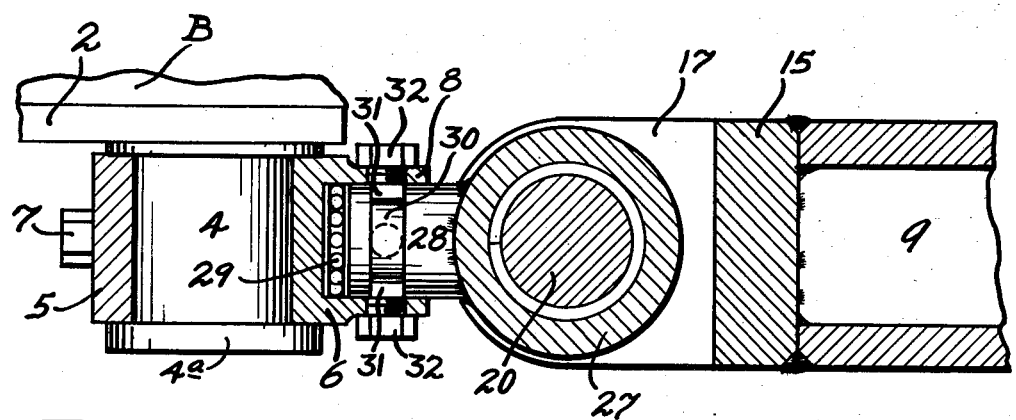
Figure 2 is an enlarged horizontal detail sectional view at line 2—2 of Fig. 1.
Figure 3:
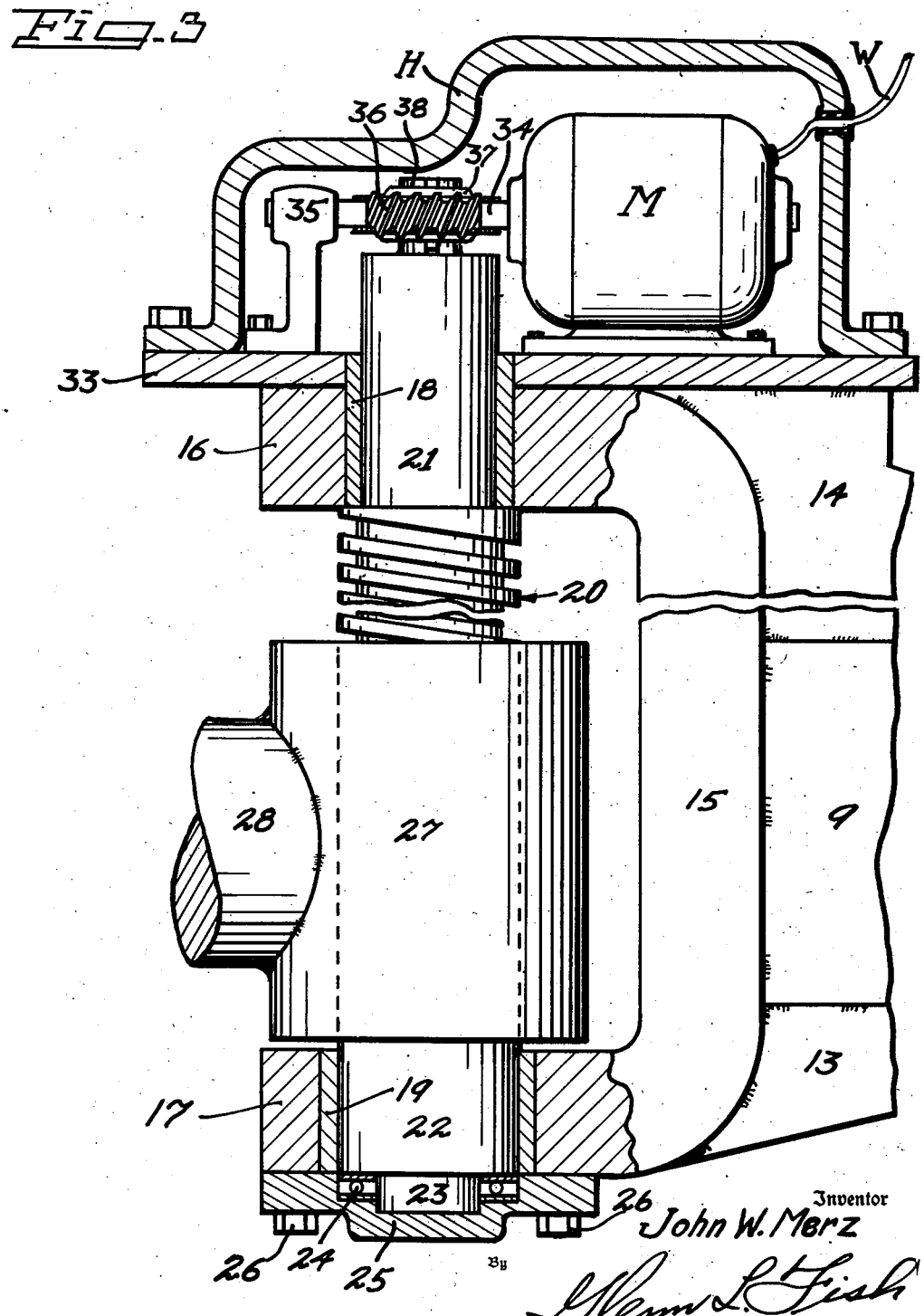
Figure 3 is an enlarged view in elevation and partial section of the operating mechanism for the scraper frame and blade.

In order that the general arrangement and utility of parts may readily be understood I have disclosed in Fig. 1 a typical motor operated tractor T propelled by endless chain treads E, and provided with the usual driver's seat S and readily accessible control lever mechanism at L. The frame of the tractor includes the longitudinally extending, upright tread frames B, and a cable hoist C is indicated at the front of the tractor for vertically adjusting the blade 1, and for elevating the blade to inoperative position for transportation purposes.

As usual the scraper blade extends across the front of the tractor in upright position, and dual operating units, one at each side of the tractor, are selectively employed for laterally tilting the scraper blade.

In equipping the tractor with the scraping implement, I employ a pair of attaching plates 2, one bolted at 3 to each of the tread frames B, and each of the attaching plates is provided with a trunnion or journal 4 having an annular end flange 4a, which trunnions form axially alined swivel pins for the two sides of the scraper frame. Each trunnion has a split swivel bearing including two bearing blocks 5 and 6 that are united by bolts 7, and the block 6 is fashioned with a forwardly projecting and cylindrical bearing sleeve 8 forming part of the flexible coupling for the side bars 9 of the scraper frame.

At their front ends of the two side bars 9 are pinned or bolted at 10 to complementary ears 11 of the concaved blade 1, and suitable diagonal braces 12 unite the opposite ends of the blade with the two side bars 9. The side bars are reinforced by gussets 13 and 14, and the rear end of each side bar terminates in an upright bearing yoke 15 having an upper bearing arm 16 and a lower bearing arm 17, and these bearing arms are equipped with bearing sleeves 18 and 19. The yoke, gussets and the rear end of each side bar, are rigidly united as by welding to provide a strong rugged, and durable member for coupling the scraper frame to its swivel mount.

Inasmuch as the complementary dual couplings and operating units, one located at each side of the tractor, for each rear end of the scraper frame, are identical, a description of the right hand coupling and operating unit will suffice for both of them.

Within the arms of the bearing yoke 15 an upright screw bar 20 is journaled by an upper journal 21 in sleeve 18 and a lower journal 22 mounted in the sleeve 19, and the stepped lower end 23 of the screw bar is seated upon a thrust bearing 24 that is supported by a recessed bearing plate 25, bolted at 26 to the arm 17 of the bearing yoke 15.

For adjustably coupling the side bar and its screw bar with the trunnion 4, a T-shaped coupler including an upright internally threaded bushing 27 is threaded on the screw bar and fashioned with a rearwardly extending integral stud shaft 28 that is inserted in the bearing sleeve 8.

To permit a pivotal movement between the inserted shaft and the bearing sleeve, and to prevent longitudinal displacement of the parts, the shaft is provided with an annular exterior groove 30 in which the reduced pin ends 31 of two or more retaining bolts 32 are fitted, and the radially arranged bolts are threaded through the annular wall of the bearing sleeve, to retain the rear end of the shaft 28 against the thrust bearing 29 seated in the sleeve.

By this arrangement of the coupling parts, the scraper blade and its frame may bodily be raised and lowered on the swivel mounts as pivotal centers, and in addition, by the use of the screw bars and bushings 27 the two side bars 9 may selectively and independently be raised and lowered to tilt the scraper blade.

This lateral tilting of the scraper blade with relation to the tractor is accomplished by dual motor operated units, one at each side of the tractor, each mounted upon a horizontal stand 33, mounted as by welding on the top of a gusset 14 of a side arm of the scraper frame and also on the top of the yoke arm 16, and a reversible electric motor M is mounted on the stand and enclosed by a housing H, with lead wires W extended through a grommet of the housing to a source of electrical supply for the reversible motor.

For transmitting power from the motor to rotate the screw bar within its traveling bush 27, the shaft 34 of the motor which is journaled in a spaced gearing 35 mounted on a stand within the housing, is equipped with a worm screw 36 that meshes with a complementary worm gear 37 rigidly mounted upon the upper reduced stud 38 of the screw bar.

Each of the two operating motors is equipped with electric controls readily accessible to the driver who sits in the seat S, and the blade may thus readily be manipulated from a level or usual working position. or a selected end of the blade may be tilted with relation to the tractor as one of the side bars 9 is raised or lowered with the shift 28 at the opposite side of the tractor forming a pivotal point for the scraper frame.

Having thus fully described my invention, what I claim as new and desire to secure by Letters Patent is:

1. The combination in a bulldozer attachment for a tractor with a laterally tiltable scraper frame having a rigid upright bearing yoke, a horizontally extending trunnion rigid with the tractor, and a swivel bearing on the trunnion, of a screw bar journaled in the yoke and means for turning the screw bar, a coupler having a bushing threaded on the screw bar, a stud shaft rigid with the bushing and journaled in the swivel bearing in a plane perpendicular to the axis of the trunnion, said stud shaft having an exterior annular groove. and radially arranged bolts threaded through the swivel bearing coacting with the groove to retain the shaft in the swivel bearing.

2. The combination in a bulldozer attachment for a tractor with a laterally tiltable scraper frame having a rigid upright bearing yoke, a screw bar journaled in the yoke, a motor mounted on the frame and power transmission mechanism between the motor and the screw bar, a horizontally extending trunnion rigid with the tractor, and a swivel bearing on the trunnion, of a coupler having a bushing threaded on the screw bar, a stud shaft rigid with the bushing and journaled in the swivel bearing in a plane perpendicular to the axis of the bearing, and means for retaining said stud shaft against longitudinal movement in the swivel bearing.

3. The combination in a bulldozer attachment for a tractor including a laterally tiltable scraper and frame, with an upright bearing yoke rigid with the frame. a screw bar journaled in the yoke, and means for turning the screw bar, of a horizontally extending trunnion rigid with the tractor, a swivel bearing on the trunnion and a radially extended bearing sleeve rigid with the swivel bearing, a T-shaped coupler having a bushing threaded on the screw bar, a radially extended stud shaft integral with the bushing and journaled in the bearing sleeve, an antifriction bearing between the end of the stud shaft and the bearing sleeve, said stud shaft having an exterior annular retaining groove enclosed by the bearing sleeve, and a plurality of radially arranged retaining bolts threaded through the bearing sleeve for coaction with said groove.

JOHN W. MERZ.

References Cited in the file of this patent

UNITED STATES PATENTS

| Number | Name | Date |
| --- | --- | --- |
| 1,991,781 | Bird | Feb. 19, 1935 |
| 2,169,606 | Hutchins et al. | Aug. 15, 1939 |
| 2,173,158 | Corbett | Sept. 19, 1939 |
| 2,182,412 | Stewart | Dec. 5, 1939 |
| 2,185,179 | Bird et al. | Jan. 2, 1940 |
| 2,238,346 | Sorensen | Apr. 15, 1941 |
| 2,396,407 | Austin | Mar. 12, 1946 |
| 2,402,352 | Taylor | June 18, 1946 |
| 2,408,268 | Peterson et al. | Sept. 24, 1946 |